United States Patent
Boileau

[11] 3,717,190
[45] Feb. 20, 1973

[54] RADIAL TIRE HAVING INTERPOSED PLIES AT TREAD REINFORCEMENT EDGES
[75] Inventor: Jacques Boileau, Clermont-Ferrand, France
[73] Assignee: Compagnie Generale des Etablissements Michlen, raison sociate Michelin & Cie, Clermont-Ferrand (Puy-de-Dome), France
[22] Filed: March 1, 1971
[21] Appl. No.: 119,689

[30] Foreign Application Priority Data
March 2, 1970 France....................7007456

[52] U.S. Cl..................................152/361
[51] Int. Cl..................................B60c 9/64
[58] Field of Search..............152/361, 357, 356

[56] References Cited
UNITED STATES PATENTS
3,554,261  1/1971  Mirtain et al.....................152/361
2,331,323  10/1943  Jahant..............................152/357

Primary Examiner—Gerald M. Forlenza
Assistant Examiner—George H. Libman
Attorney—Brumbaugh, Graves, Donohue & Raymond

[57] ABSTRACT

A radial tire has a tread reinforcement of two plies with staggered edges. Fittings of wedge-shaped cross section are interposed between the carcass and the tread reinforcement at each edge of the tread reinforcement. Each fitting comprises two interposed plies of different widths. The interposed plies comprise cords forming a triangulated structure with the radial carcass cords and extending laterally beyond the tread reinforcement.

7 Claims, 4 Drawing Figures

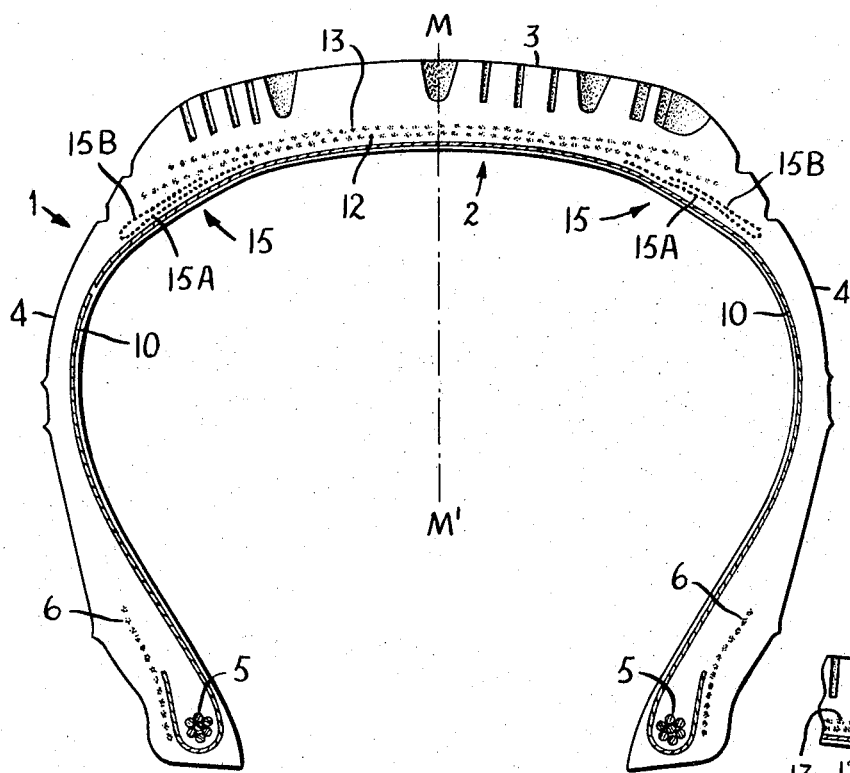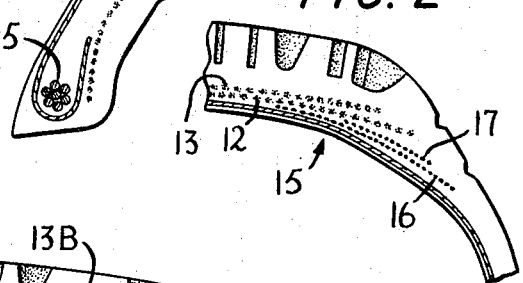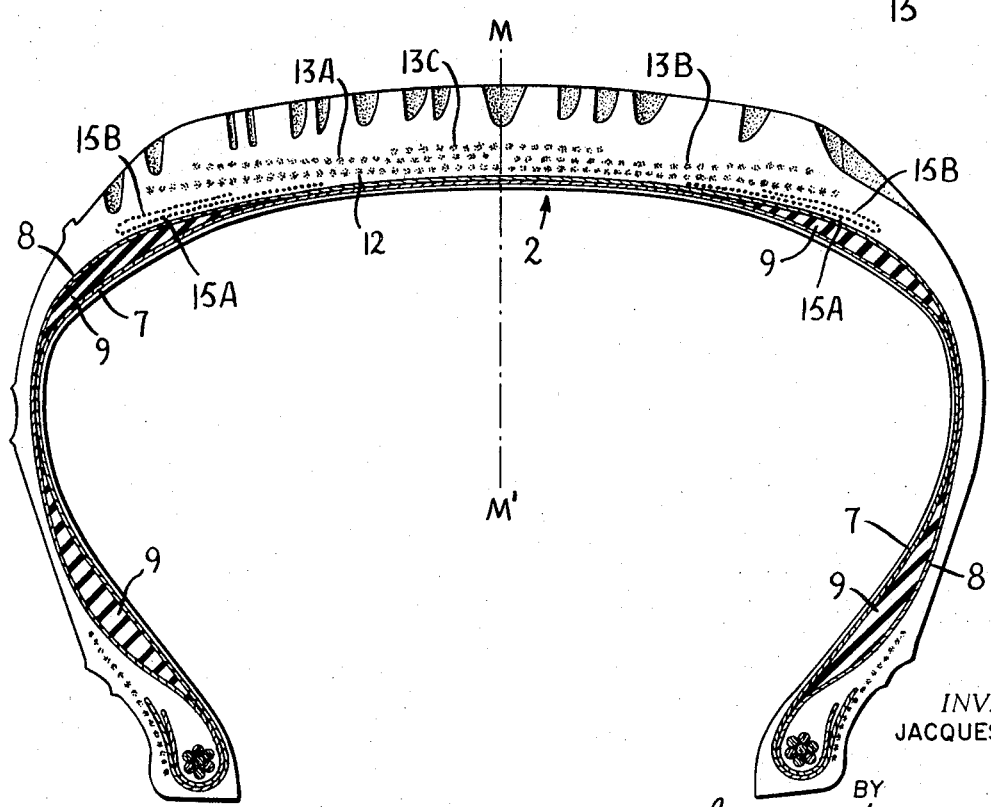
FIG. 1
FIG. 2
FIG. 3
INVENTOR.
JACQUES BOILEAU

RADIAL TIRE HAVING INTERPOSED PLIES AT TREAD REINFORCEMENT EDGES

BACKGROUND OF THE INVENTION

This invention relates to tires and, more particularly, to novel and highly effective tires of the radial type.

Radial tires comprise a reinforcement consisting of two parts: a carcass composed of radially arranged cords or cables and a tread reinforcement extending below the tread and comprising several plies of intersecting cords or cables arranged in directions differing only slightly, if at all, from the longitudinal direction.

In this type of tire, the regions of the edges of the tread reinforcement are highly stressed, particularly when traveling at high speed. When a tire under load is caused to roll at an increasingly high speed until it becomes unusable, it is generally as a result of tearing or destruction of the bonding rubber between the carcass and one of the edges of the tread reinforcement that the unusable condition occurs. It is obviously desirable to improve the speed limit, that is to say, the maximum speed which the tire can withstand, since one at the same time improves its ability to withstand higher and higher forces.

Various arrangements which favor the bonding between the carcass and the edges of the tread and increase the limit speed of a radial tire are known in the literature or in practice.

A first conventional arrangement consists in staggering the edges of crown plies; the crown plies are wider and/or extend farther from the middle plane the closer they are to the carcass. This staggering of the crown ply edges in the vicinity of the carcass produces a gradation of the rigidity of the tread reinforcement and favors a better bond with the carcass.

Another arrangement which is currently employed, particularly in tires with metal tread reinforcement, consists in imparting to the carcass and tread reinforcement different transverse curvatures: the carcass and the tread reinforcement are adjacent in the portion of the top close to the middle plane; they diverge progressively towards the edges, the tread reinforcement having a shape which approaches the shape of a cylinder. Between the carcass and the tread reinforcement, in the regions of the edges of the latter, there are interposed fittings of wedge-shaped cross-section made of a rubber-base mixture having good properties of resistance to tearing.

A final conventional arrangement, which is at times used, consists of reinforcing the carcass by means of a narrow ply at each of the two edges of the tread reinforcement. This narrow ply is made of cords or cables arranged at an angle intermediate the angle of the cords of the top plies and that of the cords of the carcass. This arrangement is described in detail in French Pat. No. 1,435,804 and in its U.S. Pat. counterpart, No. 3,386,487.

These various known arrangements produce a transition between sidewalls which are relatively deformable since reinforced only by radial cords and a crown which is relatively rigid since it is reinforced by cords arranged in at least three directions. They contribute to improving the bond between the carcass and the crown reinforcement and therefore the strength of the tire when subjected to forces close to the limit which it can withstand. They do not, however, provide a final solution, and it is still desirable further to improve the coherence between the various elements of the reinforcement.

SUMMARY OF THE INVENTION

An object of the present invention is to improve the coherence between the various elements of the tire reinforcement. More particularly, an object of the invention is to provide an increase in the limit velocity and correlative properties of radial-carcass tires by improving the coherence between the carcass and the tread reinforment, particularly in the case of a very rigid tread reinforcement consisting, for instance, of metal cables.

The foregoing and other objects are attained in accordance with the invention by a tire which is provided with a radial carcass and a tread reinforcement comprising at least two plies and staggered edges, which is adjacent the carcass in the central portion of the crown and spaced from the carcass and connected to it in the side portions of the crown by interposed fittings of wedge-shaped cross section. The tire is characterized in that each of the interposed fittings is formed by the superimposing of two plies of different widths the cords or cables of which form a triangulated structure with the cords or cables of the carcass and protrude laterally from the tread reinforcement so as to complete the staggering of the crown plies.

As can be seen, the invention provides an increase in the compactness of the reinforcement of the tire; the tread reinforcement and the carcass, in the side portions of the crown where they are not directly in contact with each other, are connected to one another by a superimposing of plies arranged in such a manner as to take up the difference in transverse curvature between the tread reinforcement and the carcass and form a triangulation with the cables of the carcass.

Experience shows that the arrangement thus described results in an effective hooping of the carcass, assures improved connection to the tread reinforcement and improves the limit velocity and the strength of the tire without resulting in any loss from the point of view of comfort, endurance or wear.

The regions of the carcass to be reinforced in accordance with the invention by means of interposed fittings formed of a plurality of superimposed plies are limited to the side regions of the crown.

Preferably, in the central region of the crown, the tread reinforcement and the carcass are adjacent over a width corresponding approximately to half the width of the tire. One can, however, use as common element for the two interposed fittings a single ply which extends over the entire width of the crown, in particular for reasons of convenience in manufacture. This common element serves as the first or second ply in both the left-hand and the right-hand interposed fitting, the other ply of each fitting being formed either by a separate ply or by the turning over of the edge of the common element.

It is advisable not to extend the interposed fittings too far into the sidewalls. While it is permissible to extend one of the plies constituting the interposed fitting into the sidewall, for instance over one-third or one-half of the height of the sidewall even though at the price of loss of comfort, it is necessary to avoid forming a triangulation with the carcass cables outside the region of the crown; a triangulation of the upper part of the sidewalls would make the tire uncomfortable and would decrease its endurance. In practice, the interposed fittings protrude laterally beyond the tread reinforcement over a distance of the same order of magnitude as the stagger spacing of the crown ply edges, namely 5 to 15 mm in the case of tires for passenger cars, and in any event at most 15 percent of the width of the tread.

The preferred embodiments are further characterized by the following features:

a. The plies forming the interposed fittings consist of cords arranged at an angle with the longitudinal direction of between 10° and 30°. The improvement obtained does not depend substantially on the value of this angle within these limits. Slightly better results are obtained with an angle of 10°. The order of superimposing of the plies forming the interposed fitting is immaterial; it is unimportant whether the angle of the cords of the crown ply and those of the adjacent interposed ply are larger or smaller; however, the resistance of the interposed fittings is increased by adopting for the cords of the interposed fitting ply which is closer to the carcass an angle larger than that made by the cords of the interposed fitting ply which is farther from the carcass.

b. The cords of the interposed fitting plies are of a material which contracts under heat, preferably polyamide. The choice of a material which contracts under heat is justified by the fact that under the action of the heating produced by the rolling of the tire, the cords contract and their contraction results in a more active binding of the carcass. Polyamides are preferred due to their good adherence to rubber, their great elasticity, their lightness and their strength.

c. The cords used have, in the case of passenger car tires, a diameter less than or equal to 0.5 mm and are arranged side by side at a distance apart of less than 1 mm. The selection of such dimensions makes it possible to miniaturize the group of plies forming the interposed fitting and accordingly to house the fitting between the carcass and the tread reinforcement without having to move the latter away from the carcass in an undesirable fashion. The assembly of reinforcements (carcass, interposed fittings and tread reinforcement) thus form a compact assembly without undesirable spacing.

d. Two superimposed plies forming a wedge-shaped interposed fitting are obtained from a single ply folded in the shape of a U with unequal arms. The widths of the two arms are selected so as to permit the interposed fitting to assume a wedge-shaped cross section. The fold line is intended to be located on the side opposite the middle plane of the tire. Instead of a folded ply, it may be desirable, in order to simplify manufacture, to use two separate plies; they are then preferably arranged in such a manner that their ends are a few millimeters from each other on the side opposite the middle plane.

BRIEF DESCRIPTION OF THE DRAWING

An understanding of additional aspects of the invention can be gained from a consideration of the following detailed description of preferred embodiments thereof, in conjunction with the appended figures of the drawing, wherein:

FIG. 1 is a view in radial section of a first embodiment of a tire in accordance with the invention;

FIG. 2 is a fragmentary view in radial section of another embodiment of a tire in accordance with the invention;

FIG. 3 is a view in radial section of another embodiment of a tire in accordance with the invention.

DESCRIPTION OF THE PREFERRED EMBODIMENTS

Figure 4:
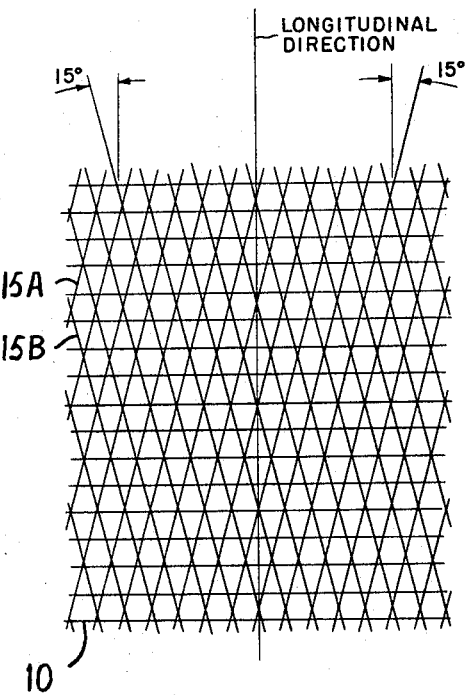
FIG. 4 is a fragmentary developed plan view showing the relative orientations of certain cords of plies laid in accordance with the invention.

FIG. 1 shows in radial section a tire 1 of size 165 × 380 ZX.

The tire has a crown 2, a tread 3 and two sidewalls 4. Its reinforcement comprises a carcass 10 made of radially arranged rayon cords the ends of which are wound around steel bead wires 5. Stiffeners 6 stiffen the region of the sidewalls 4 adjacent the bead wires 5. The reinforcement of the tire further comprises a tread reinforcement including two plies 12 and 13 of identical metal cables, each formed of four steel wires of a diameter of 0.23 mm each. The ply 12 has a width of 130 mm and the ply 13 a width of 120 mm so that their edges are staggered. The cables are arranged in such a manner as to form an angle of 22° with the median plane M–M' of the tire, from left to right in the case of the ply 12, and from right to left in the case of the ply 13.

Between the carcass 10 and the tread reinforcement there are arranged in accordance with the invention two insertions 15, each composed of a ply of cables folded to form two sections 15A and 15B. The section 15A has a width of 27 mm and the section 15B a width of 18 mm. Each insertion as a whole protrudes laterally from the ply 12 by a width of about 8 mm. The cables of these insertions are polyamide cables of 420 × 2 denier; they have a diameter of 0.4 mm, have a center-to-center spacing of 0.6 mm and are arranged along an angle of ± 15° with the median plane M–M'. The cords of the carcass 10 and of the sections 15A and 15B therefore form a triangulated structure, as illustrated in FIG. 4.

In the embodiment shown in FIG. 2, each insertion 15 is composed of two separate plies 16 and 17 composed of yarns inclined 15° in opposite directions. The ply 16 has a width of 36 mm and the ply 17 a width of 25 mm. The end of the ply 16 farther from the median plane M–M' protrudes beyond the ply 17 by a width of about 3 mm. In its turn, the end of the ply 17 which is farther from the median plane M–M' protrudes beyond the ply 12 by a distance of about 5 mm. Finally, the end of the ply 12 protrudes beyond the ply 13 by a distance of about 5 mm. Otherwise, the tire of FIG. 2 is identical to that of FIG. 1; in particular, the cords of the inserts 15 are identical and arranged in the same manner as in FIG. 1.

Comparative maximum velocity tests have given the following results:

|  | Maximum Velocity |
|---|---|
| 1. Control tire (tire in which the insert 15 is formed, in a conventional manner, of a suitable layer of rubber of wedge-shaped section) | 205 km/hr |
| 2. Tire according to FIG. 1 | 222 km/hr |

| | |
|---|---|
| 3. Tire according to FIG. 1 but with inversion of the direction of the angles of the cords of the plies 16 and 17 | 222 km/hr |
| 4. Tire according to FIG. 1 but with the cords of the plies 16 and 17 inclined 10° instead of 15° | 227 km/hr |
| 5. Tire according to FIG. 1 but with the cords of the plies 16 and 17 inclined 30° instead of 10° | 220 km/hr |
| 6. Tire according to FIG. 2 | 222 km/hr |
| 7. Tire different from that of FIG. 2 by the replacement of the ply 17 by a layer of rubber of the same thickness | 207 km/hr |

As shown by these tests, what is important is that the insert 15 be formed of two plies of cords which cross and are triangulated by the carcass cords. If one uses only a single ply, the improvement is insignificant.

FIG. 3 shows in radial section a tire of size 185 × 14 XAs in accordance with the invention.

As compared with the tire shown in FIGS. 1 and 2, a number of differences are noted, particularly the following. The carcass is composed of two plies 7 and 8 which, in the areas of the sidewalls close to the crown 2 and of the steel wires 5 are separated by profiled pieces of hard rubber 9 of lenticular cross section. The crown ply 13 is divided into two sections 13A and 13B separated from each other at the median plane M–M' by a space of a few millimeters. This space is covered by a ply 13C which extends over each of the edges of the sections 13A and 13B adjacent this space. As in the case of FIG. 1, the inserts 15 are composed of a ply of polyamide cables which is folded into two sections 15A and and 15B of a size of 40 and 28 mm, respectively, and protruding from the ply 12 by a distance of about 8 mm, namely by the same amount as that by which the ply 12 protrudes from the plies 13A and 13B. The cables of the inserts 15 are identical to those of the inserts 15 of FIGS. 1 and 2 and inclined about ± 15° to the median plane M–M'.

The use of inserts 15 of nylon cables instead of inserts made in the form of profiled rubber pieces retaining the same form for the carcass and the tread reinforcement has made it possible to increase the maximum speed by 30 km/hr, which is a considerable gain for a minimum change in appearance.

Although the examples illustrated in the figures refer to tires for passenger cars, the invention is not limited to this type of tire and may be used on tires for utility vehicles such as trucks, delivery trucks, busses, etc., and in general in all cases in which a tearing may occur between the carcass and the tread reinforcement. It is, of course, advisable to use inserts of cables that have suitable characteristics for the tire sizes in question.

Thus there is provided in accordance with the invention a novel and highly effective tire capable of traveling safely under heavy loads and at high speeds. Many modifications of the preferred embodiments described herein will readily occur to those skilled in the art upon study of the present disclosure. Accordingly, the invention is to be construed as including all the embodiments thereof within the scope of the appended claims.

I claim:

1. A tire comprising a carcass of radial cords and a tread reinforcement, said tread reinforcement comprising at least two tread plies with staggered edges and being positioned in closely spaced apart relation to the carcass in the central portion thereof, further comprising interposed fittings of wedge-shaped cross section between said carcass and said tread reinforcement filling the space between said carcass and said tread reinforcement at each edge of said tread reinforcement, each of said fittings comprising two interposed plies of different widths, said interposed plies comprising cords forming a triangulated structure with said radial cords and extending laterally beyond the tread reinforcement over a distance of the same order of magnitude as the stagger spacing of the crown ply edges.

2. A tire according to claim 1 wherein the cords of said interposed plies are inclined 10° to 30° to the longitudinal direction of the tire.

3. A tire according to claim 1 wherein the cords of said interposed plies are made of a material that contracts under heat.

4. A tire according to claim 1 wherein the cords of said interposed plies are made of polyamide.

5. A tire according to claim 1 wherein the cords of said interposed plies are of sufficiently small diameter and said interposed plies are sufficiently closely spaced apart that said interposed fittings do not necessitate displacement of said carcass and said tread reinforcement with respect to each other.

6. A tire according to claim 1 for use on a passenger car wherein the cords of said interposed plies are made of polyamide and have a diameter not exceeding 0.5 mm.

7. A tire according to claim 1 wherein said interposed plies are made of a single ply bent into the shape of a U with unequal arms.

* * * * *